Feb. 6, 1923.
W. J. CREED.
VEGETABLE CUTTER.
FILED AUG. 6, 1920.
1,443,948
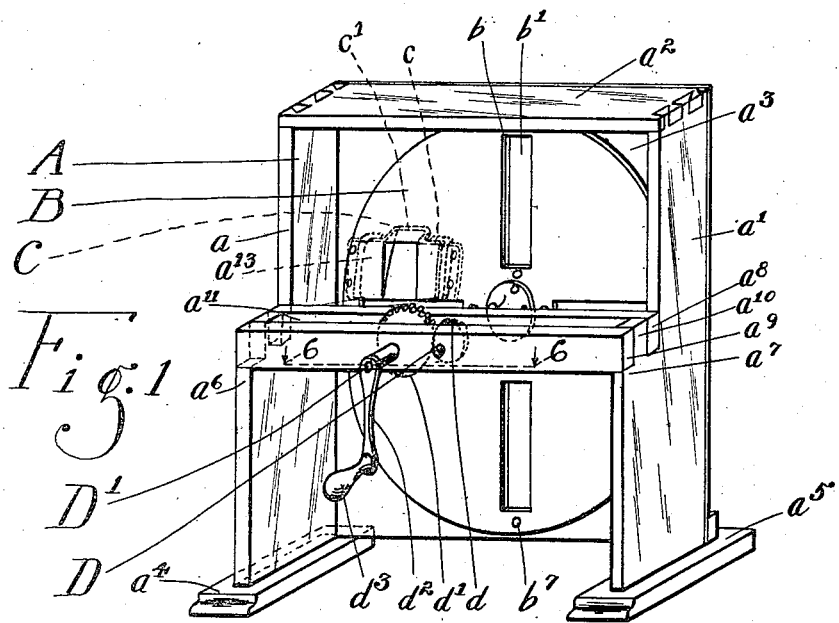
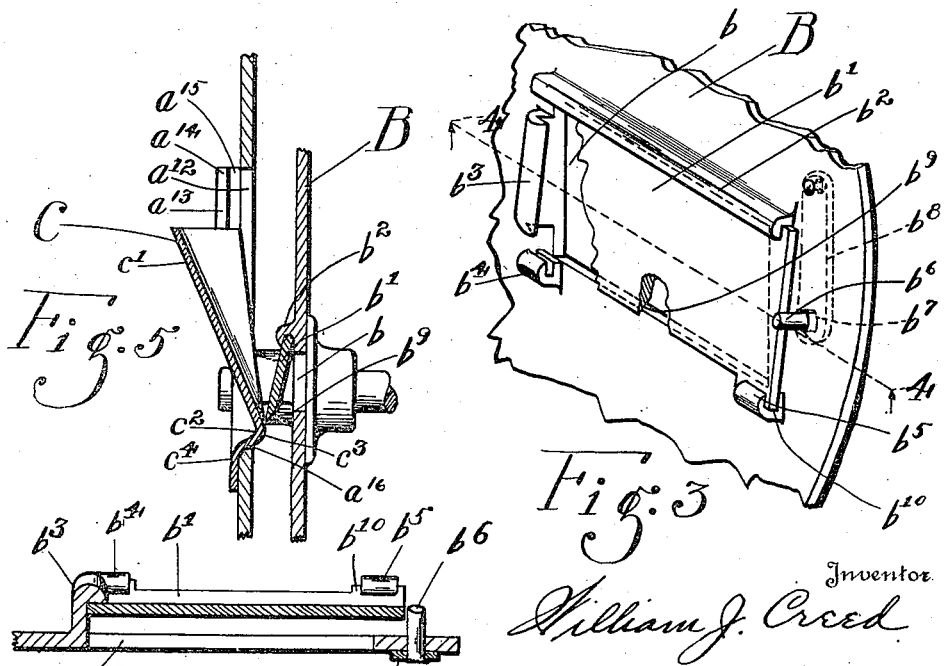

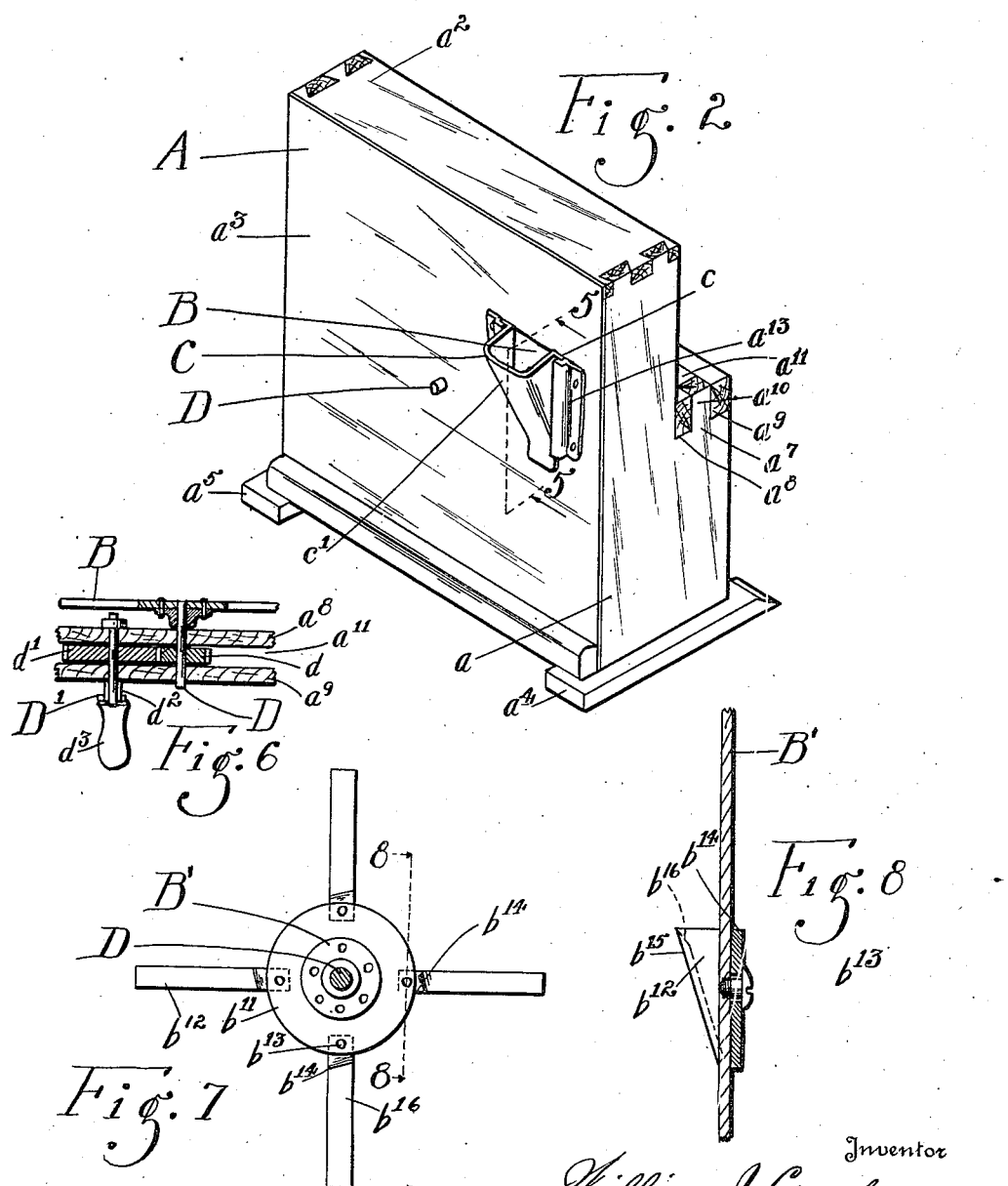

Patented Feb. 6, 1923.

1,443,948

UNITED STATES PATENT OFFICE.

WILLIAM J. CREED, OF CINCINNATI, OHIO.

VEGETABLE CUTTER.

Application filed August 6, 1920. Serial No. 401,591.

*To all whom it may concern:*

Be it known that I, WILLIAM J. CREED, a citizen of the United States of America, and resident of Cincinnati, in the county of Hamilton and State of Ohio, have invented a new and useful Improvement in a Vegetable Cutter, of which the following is a specification.

An object of my invention is to provide a vegetable cutter or slicer, adaptable especially to family use, in which the cutting blades are actuated and in which such blades are so housed as to minimize the possibilities of injury to either the operator or the device.

Another object is a vegetable cutter in which the cutting action of the blade retains the vegetable in the holder and in which the blade will have a sawing cut.

Another object is to provide a device for the purposes stated that may be readily cleaned, and in which the cutting blades may be readily inserted and removed therefrom.

These and other objects are attained by the means described herein and disclosed in the accompanying drawing in which:—

Fig. 1 is a perspective front view of a device embodying my invention.

Fig. 2 is a perspective rear view of the device shown in Fig. 1.

Fig. 3 is an enlarged fragmental perspective view of a cutting disk forming a detail of my invention.

Fig. 4 is a sectional view on line 4—4 of Fig. 3.

Fig. 5 is an enlarged sectional view on line 5—5 of Fig. 2.

Fig. 6 is an enlarged sectional view on line 6—6 of Fig. 1.

Fig. 7 is a front elevation of a modified form of cutting wheel.

Fig. 8 is an enlarged sectional view on line 8—8 of Fig. 7.

My invention comprises a frame A within which is revolved a cutting disc or wheel B having a series of blades $b'$ adapted to slice or cut vegetables fed thru a chute C in the frame.

The frame A has the sides $a$ and $a'$, the top $a^2$, and the back $a^3$, being open at the bottom. The sides $a$ and $a'$ are mounted on suitable blocks $a^4$ and $a^5$ respectively, serving as bases for the frame. The sides $a$ and $a'$ have the shoulders $a^6$ and $a^7$ respectively, such shoulders being about midway between the top $a^2$ and the bases $a^4$ and $a^5$, and at the front of the frame. Extending between the shoulders are two cross bars $a^8$ and $a^9$ adapted to be supported by the sides and are spaced from one another by the lugs $a^{10}$ extending upward from the shoulders, whereby a slot $a^{11}$ is formed across the front of the frame. Midway of the cross bars a revoluble horizontal shaft D extends thru such bars and projects thru the back $a^3$ of the frame. A feed slot $a^{12}$ is formed in the back $a^3$. The support plates $a^{13}$ having flanges $a^{14}$ are mounted upon the exterior of the back, adjacent to the slot $a^{12}$, the flanges and the back adjacent to the slot forming vertical ways $a^{15}$.

Upon the shaft D, adjacent to the back $a^3$ and parallel with the back is mounted a disc B having a series of radial slots $b$ therein. Adjacent to and extending partly over the rear of the slots are the cutting blades $b'$. These blades may be retained in position by any means. In the accompanying drawing the blades are shown as engaging in ways or seats formed on the flanges $b^2$, $b^3$, $b^4$, and $b^5$ and being locked therein by means of the pin $b^6$ extending thru a perforation $b^7$ in the disc, such pin being normally held in locking position by the spring $b^8$ mounted upon the back of the disc. The blade has a ground cutting edge $b^9$ at an angle to the disk and adapted to cut and slice a vegetable. Besides the outside ends of the cutting edge are formed lugs $b^{10}$ and engage in the seats on flanges $b^4$ and $b^5$.

Upon the exterior of the back $a^3$ and adapted to extend over the feed slot $a^{12}$ is mounted a feed chute C in which the vegetable to be cut or sliced is placed. The chute has flanges $c$ formed on its sides, such flanges engaging in the way $a^{15}$ formed along the sides of the slot $a^{12}$. The inclined slide $c'$ of the chute extends thru the slot $a^{12}$ and has a shearing shoulder $c^2$ formed thereon adapted to present a shearing surface $c^3$ to the blades $b'$ as they pass by such chute. A base flange $c^4$ is formed on the shearing shoulder and engages the bottom wall $a^{16}$ of the slot $a^{12}$ thereby positioning the chute in the way $a^{15}$.

Mounted upon the driven shaft D and retained between the cross bars $a^8$ and $a^9$ is a gear $d$ engaging the gear $d'$ also contained between the cross bars and mounted upon the drive shaft D' having the crank $d^2$ mounted thereupon. A handle $d^3$ is attached to the crank. Gear $d'$ is preferably larger than gear $d$ so that the shaft D may be readily revolved at a fairly high rate of speed.

In the modified form of cutting wheel B' shown in Fig. 7 and Fig. 8 the disc $b^{11}$ serves merely as a base that can be mounted upon the shaft D and upon which the blades $b^{12}$ can be mounted by any suitable means such as screws or bolts $b^{13}$. The blades are so bent at $b^{14}$ that they will present an inclined face $b^{15}$ to the shearing shoulder $c^2$ when the wheel B' is revolved adjacent thereto. The cutting edge $b^{16}$ is formed on the blade and serves to cut or slice the vegetable as the blade passes the vegetable.

The chute C may be made in various shapes and forms so that if different kinds of vegetables such as potatoes, beans, cabbage, etc., are to be sliced, the chute to accommodate such vegetable can be mounted upon the back.

The operation of my device is as follows:—

The vegetable to be sliced is placed in the chute and the crank $d^2$ revolved, such rotatory motion being transmitted to the disc B by means of the gears $d'$, $d$, and the shaft D. Gravity and the pressure that the operator might exert upon the vegetable will feed the vegetable thru the slot $a^{12}$ in the back and present the vegetable to the blades $b'$ which on passing the vegetable cut the vegetable into slices, the slices passing thru the slot $b$ in the disk B and falling to the bottom of the device. Due to the rotatory motion of the blades a drawing cut is made upon the vegetable.

The blades are removed from or inserted in the seats or ways formed in the flanges $b^2$, $b^3$, $b^4$ and $b^5$ by pushing the pin $b^6$ against the spring $b^8$ until the free end of the pin is flush with the disk B, whereupon the blade may be readily moved in or out of the seats.

What I claim is:

In a vegetable cutting device the combination with a frame, of a radially slotted disk mounted revolubly within the frame, means to revolve the disk, flanges formed on the disk adjacent to the slots therein, cutting blades adapted to seat upon the flanges, pins extending thru the disk adjacent to the slots and adapted to normally prevent unseating of the blades, springs adapted to yieldingly retain the pins in their normal positions, and means to feed vegetables to the blades.

In witness whereof, I have hereunto subscribed my name this 4th day of August, 1920.

WILLIAM J. CREED.